(12) United States Patent
Kwon

(10) Patent No.: US 10,955,610 B2
(45) Date of Patent: Mar. 23, 2021

(54) EMBLEM DEVICE

(71) Applicant: HYUNDAI MOBIS Co., Ltd., Seoul (KR)

(72) Inventor: Oh Koang Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/868,930

(22) Filed: May 7, 2020

(65) Prior Publication Data

US 2020/0355867 A1 Nov. 12, 2020

(30) Foreign Application Priority Data

May 10, 2019 (KR) .................. 10-2019-0054668

(51) Int. Cl.
*F21V 8/00* (2006.01)
*B60Q 3/64* (2017.01)
*B60Q 3/20* (2017.01)
*B60R 13/00* (2006.01)
*B60R 21/215* (2011.01)

(52) U.S. Cl.
CPC ............ *G02B 6/0088* (2013.01); *B60Q 3/20* (2017.02); *B60Q 3/64* (2017.02); *B60R 13/005* (2013.01); *B60R 21/215* (2013.01); *G02B 6/0045* (2013.01)

(58) Field of Classification Search
CPC .. G02B 6/0028; G02B 6/0045; B60R 13/005; B60R 21/215; B60Q 3/64
See application file for complete search history.

(56) References Cited

U.S. PATENT DOCUMENTS

| | | | | |
|---|---|---|---|---|
| 6,053,526 A * | 4/2000 | Preisler | ................ | B60R 13/005 280/728.2 |
| 6,099,027 A * | 8/2000 | Shirk | ................... | B60R 13/005 280/728.3 |
| 8,585,082 B2 * | 11/2013 | Yamaji | .................. | B60Q 5/003 280/731 |
| 2006/0125217 A1 * | 6/2006 | Nakamura | ........... | B60R 13/005 280/731 |
| 2007/0126216 A1 * | 6/2007 | Nakamura | ........... | B60R 21/215 280/731 |
| 2008/0090031 A1 * | 4/2008 | Hirzmann | .............. | G09F 13/22 428/31 |
| 2010/0104780 A1 * | 4/2010 | Paxton | ................. | B60R 21/215 428/31 |
| 2011/0116251 A1 * | 5/2011 | Rick | ...................... | B60Q 3/68 362/84 |
| 2014/0210190 A1 * | 7/2014 | Bosch | ................... | B60R 21/203 280/728.3 |
| 2016/0121809 A1 * | 5/2016 | Barros Alonso | .......................... | B60R 21/21656 280/728.3 |
| 2019/0351860 A1 * | 11/2019 | Ohki | ..................... | B60Q 3/283 |

* cited by examiner

*Primary Examiner* — Evan P Dzierzynski
(74) *Attorney, Agent, or Firm* — H.C. Park & Associates, PLC

(57) ABSTRACT

An emblem device includes an air bag cover, a substrate mounted inside the air bag cover, a light source mounted on the substrate and configured to emit light, a light guide plate mounted outside the air bag cover and configured to diffuse the light emitted from the light source, and an emblem located in front of the light guide plate and configured to cover a part of the light guide plate. The light emitted from the light guide plate is emitted in front of the emblem through a space formed between the air bag cover and the emblem.

10 Claims, 9 Drawing Sheets

EMBLEM DEVICE

CROSS-REFERENCE TO RELATED APPLICATION

This application claims priority from and the benefit of Korean Patent Application No. 10-2019-0054668, filed on May 10, 2019, which is hereby incorporated by reference for all purposes as if set forth herein.

BACKGROUND

Field

Exemplary embodiments of the invention relate to an emblem device for a vehicle, and more particularly, to an emblem device capable of indirectly illuminating the surroundings of an emblem and improving the strength of an air bag cover with a simple structure.

Discussion of the Background

In general, an emblem is an ornament that symbolizes a brand image such as a logo of an automobile manufacturing company or a product name of an automobile for attracting consumers. The emblem may be mounted on a rear grill on the front and rear sides of an automobile, a driver air bag (DAB) cover in the center of a trunk panel and in the center of a handle, and the like. Since the emblem mounted on the driver air bag cover is assembled inside an air bag cover, surrounding parts may be damaged due to interference with the emblem. For example, the air bag cover may be weakened in the strength. Furthermore, since a transparent material is used in the entire emblem in order to illuminate the emblem, an indirect illumination effect may not be exhibited. Therefore, there is a need for solving such a problem.

The above information disclosed in this Background section is only for enhancement of understanding of the background of the invention and, therefore, it may contain information that does not constitute prior art.

SUMMARY

Exemplary embodiments of the present invention provide an emblem device capable of indirectly illuminating the surroundings of an emblem and improving the strength of an air bag cover with a simple structure.

Additional features of the invention will be set forth in the description which follows, and in part will be apparent from the description, or may be learned by practice of the invention.

In an embodiment, an emblem device for a vehicle includes: an air bag cover; a substrate mounted inside the air bag cover; a light source mounted on the substrate and configured to emit light; a light guide plate mounted outside the air bag cover and configured to diffuse the light emitted from the light source; and an emblem located in front of the light guide plate and configured to cover a part of the light guide plate, wherein the light emitted from the light guide plate is emitted in front of the emblem through a space formed between the air bag cover and the emblem.

The emblem may include: an emblem body having an area smaller than an area of the light guide plate; and one or more emblem mounting protrusions protruding from the emblem body to one side and coupled to the substrate by passing through the light guide plate, the air bag cover, and the substrate.

The air bag cover may include a mounting portion on which the substrate, the light source, the light guide plate, and the emblem are mounted, and the mounting portion may comprise mounting holes through which the emblem mounting protrusions pass, respectively, and an insertion hole into which the light source is inserted.

The mounting portion may be mounted with the light guide plate and the emblem and may comprises a mounting groove that communicates with the mounting holes and the insertion hole, and the air bag cover further includes mounting protrusions protruding outward from the mounting portion and coupled to the substrate by passing through the substrate.

The substrate may comprise first through holes through which the emblem mounting protrusions pass, respectively, and second through holes through which the mounting protrusions pass, respectively.

Each emblem mounting protrusion may comprise a first head that is formed by melting and has a width greater than a width of each first through hole, and each mounting protrusion may comprise a second head that is formed by melting and has a width greater than a width of each second through hole.

A plurality of light sources may be disposed spaced apart from each other along the space, and the insertion hole may be formed in substantially the same number as the light sources at positions corresponding to the light sources.

The light guide plate may include: a light guide plate body coming into contact with the emblem body and including third through holes through which the emblem mounting protrusions pass, respectively; and light guide plate blocks protruding from the light guide plate body to one side and coming into contact with the light source.

An emblem device for a vehicle includes an air bag cover; a substrate mounted inside the air bag cover; a light source mounted on the substrate and configured to emit light; a light guide plate mounted outside the air bag cover and configured to diffuse the light emitted from the light source; and an emblem located in front of the light source and including a light blocking portion configured to cover the light guide plate and a light transmission portion connected to the light blocking portion and configured to allow the light emitted from the light guide plate to pass therethrough.

The light transmission portion may include a transparent material.

The emblem may include: an emblem body including the light blocking portion and the light transmission portion; and emblem mounting protrusions configured to protrude from the emblem body to one side and coupled to the substrate by passing through the light guide plate, the air bag cover, and the substrate.

Further, an emblem covering a part of the light guide plate may be disposed outside the air bag cover and the light emitted from the light guide plate may be emitted in front of the emblem through the space formed between the air bag cover and the emblem, or the light transmission portion. Thus, it is possible to indirectly illuminate the surroundings of the emblem and improve the strength of the air bag cover with a simple structure.

Furthermore, the emblem mounting protrusion may have the first head that is formed by melting and have a width greater than that of the first through hole, and the mounting protrusion may have the second head that is formed by melting and has a width greater than that of the second through hole. Thus, the substrate, the light source, the light guide plate, and the emblem can be firmly fixed to the air bag cover, thereby obtaining the effect that the substrate, the light source, the light guide plate, and the emblem can be substantially prevented from being separated from the air bag cover.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
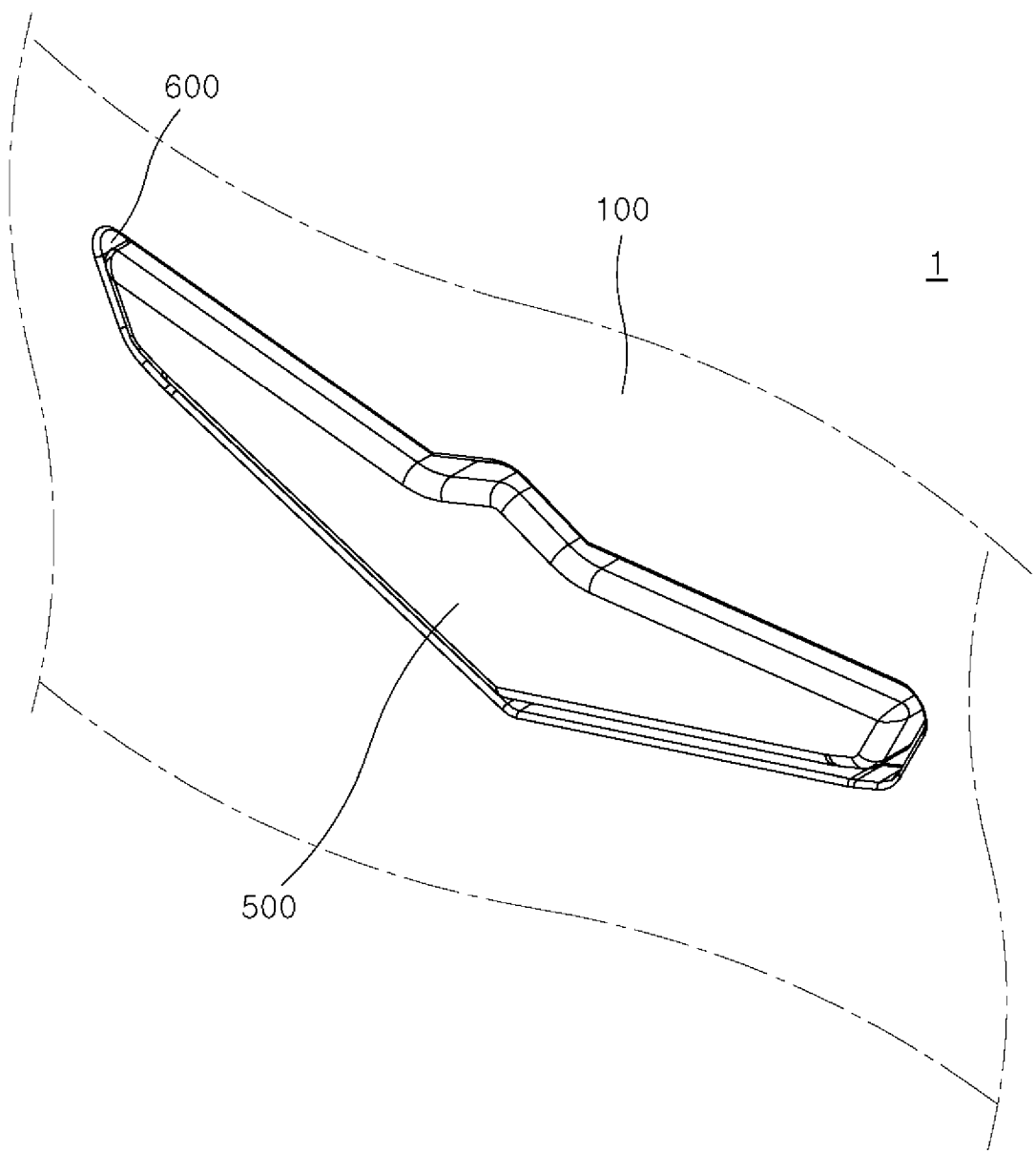
FIG. 1 is a perspective view of an emblem device constructed in accordance with an exemplary embodiment as viewed from one direction.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, an emblem device according to the present disclosure will be described below with reference to the accompanying drawings through various exemplary embodiments. In this process, the thickness of lines, the size of elements illustrated in the drawings may be exaggerated for the purpose of clarity and convenience of explanation. Terms to be described later are terms defined in consideration of functions in the present disclosure and may be changed according to the intention of a user or an operator, or practice. Accordingly, such terms should be defined based on the disclosure over the present specification.

Figure 2:
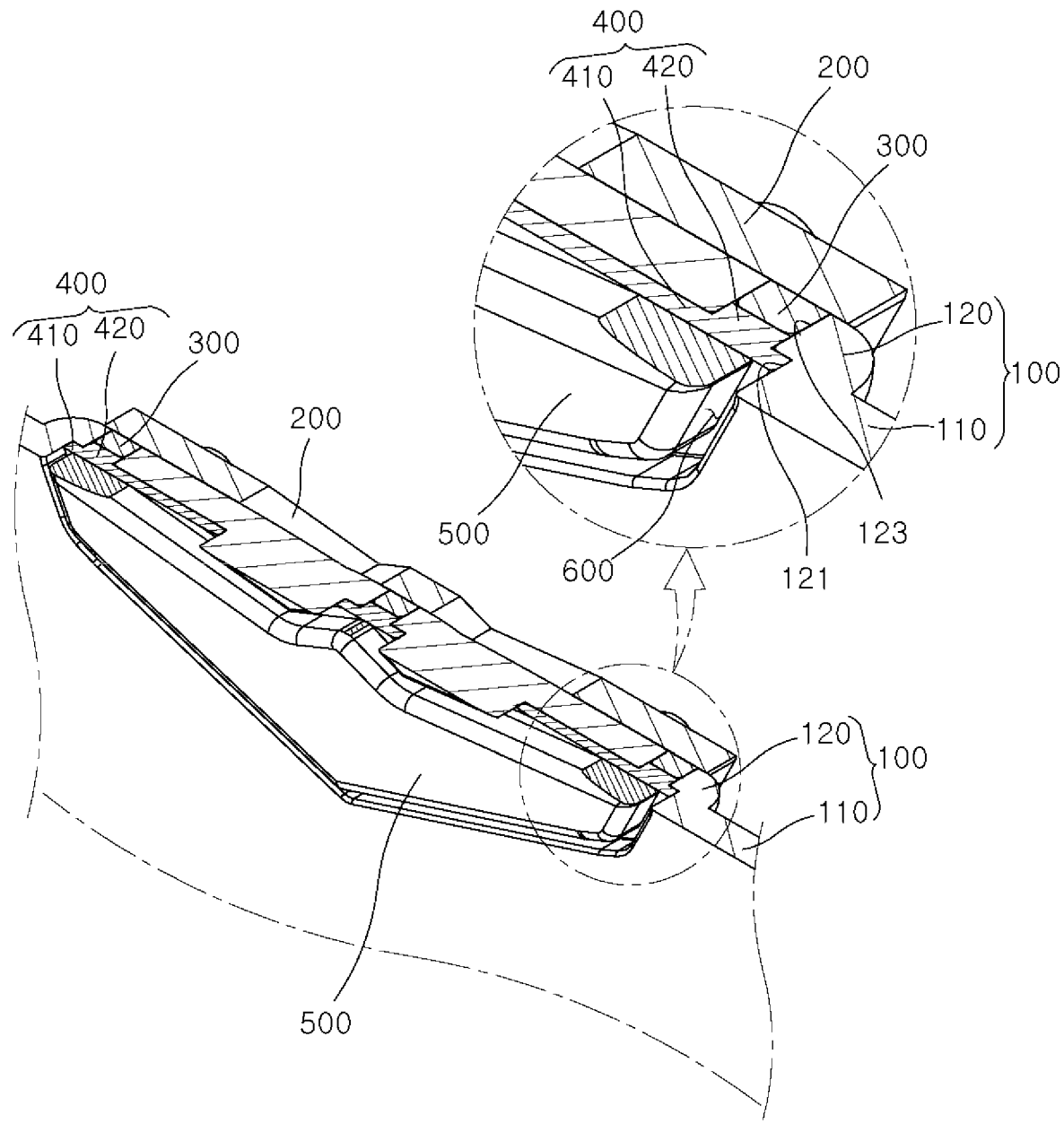
FIG. 2 is a sectional perspective view of the emblem device in accordance with an exemplary embodiment.
Figure 3:
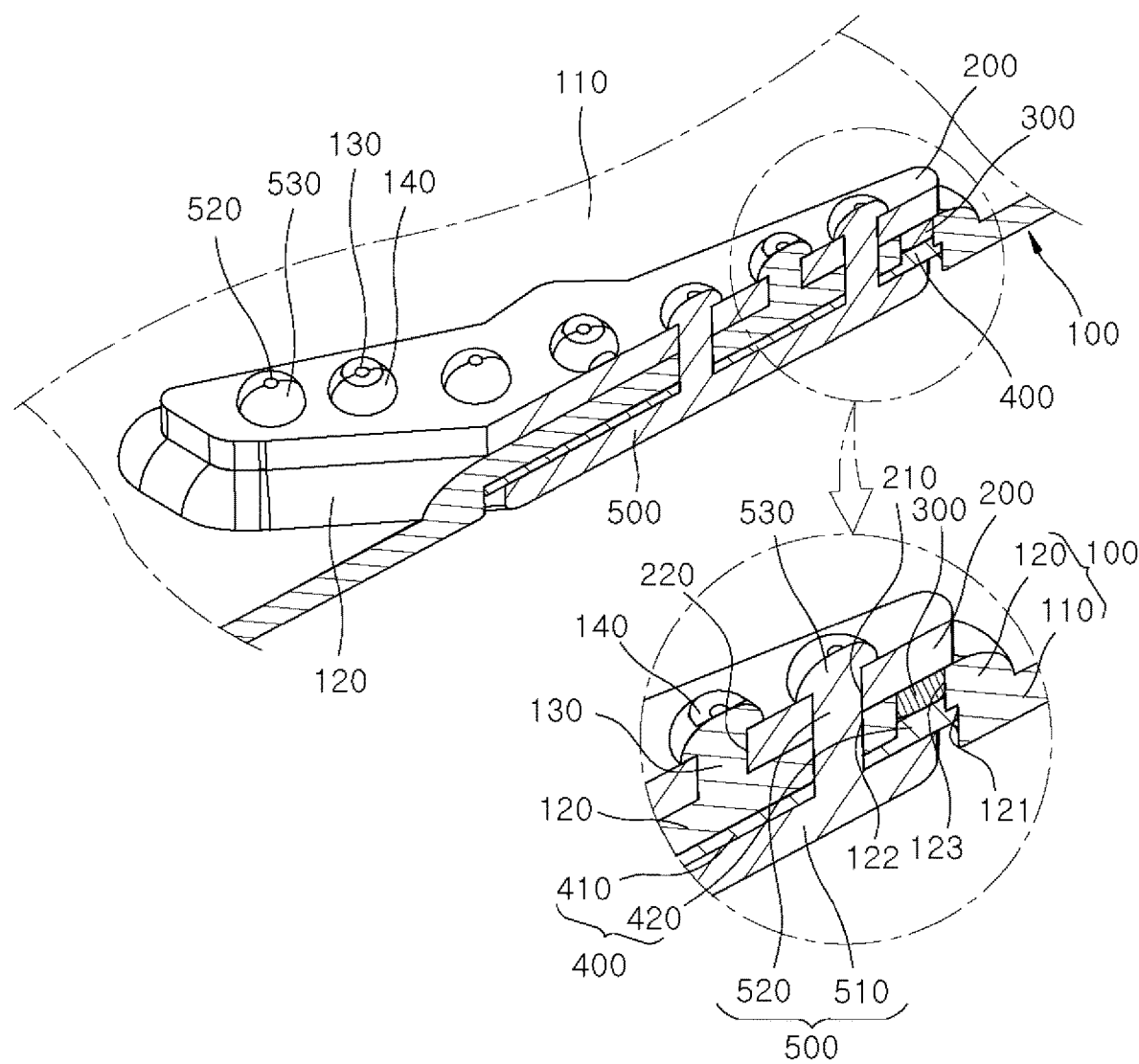
FIG. 3 is a sectional perspective view when the emblem device in accordance with an exemplary embodiment as viewed from another direction.
Figure 4:
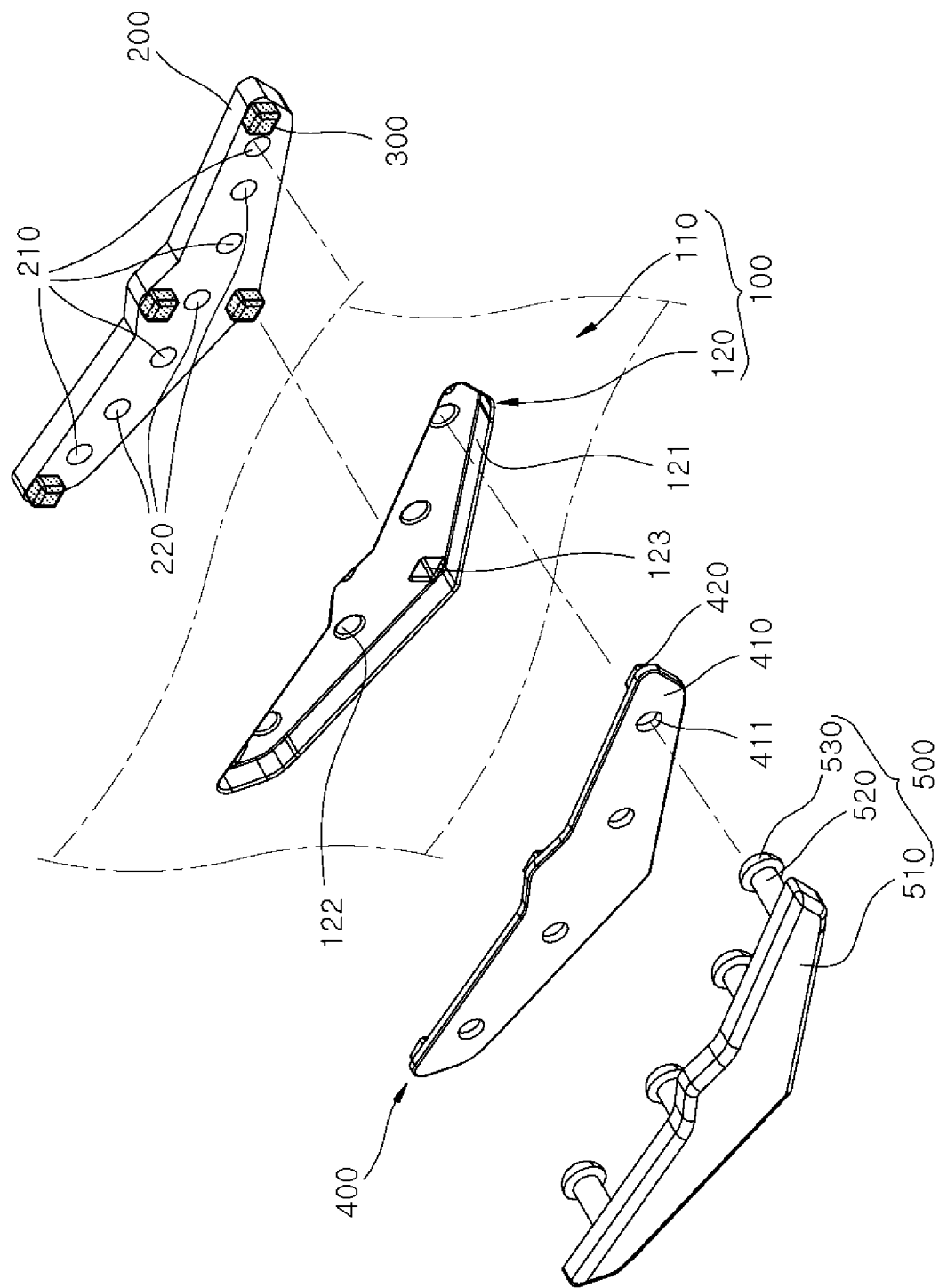
FIG. 4 is an exploded perspective view of the emblem device in accordance with an exemplary embodiment.
Figure 5:
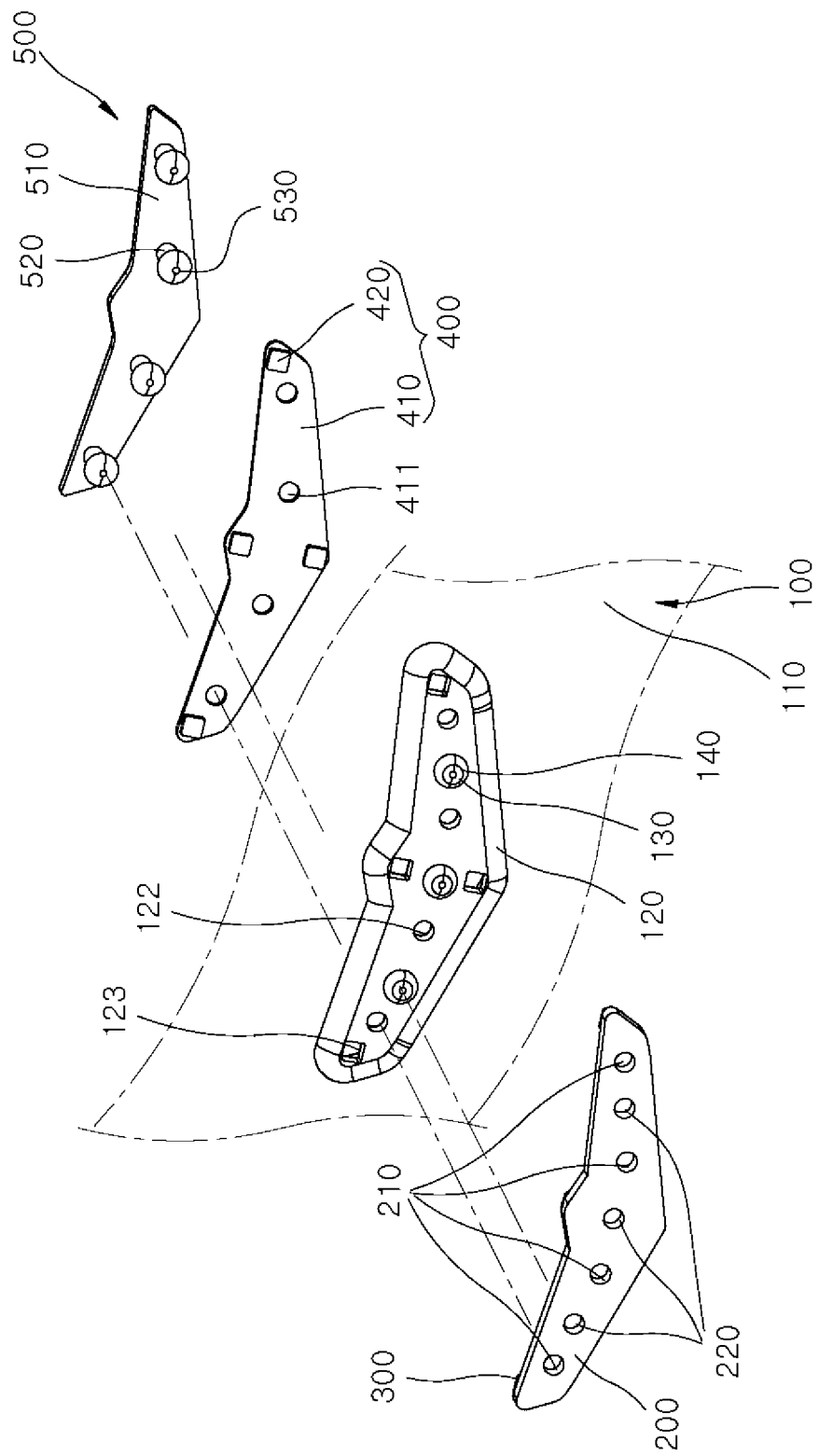
FIG. 5 is an exploded perspective view when the emblem device in accordance with an exemplary embodiment as viewed from another direction.
Figure 6A:
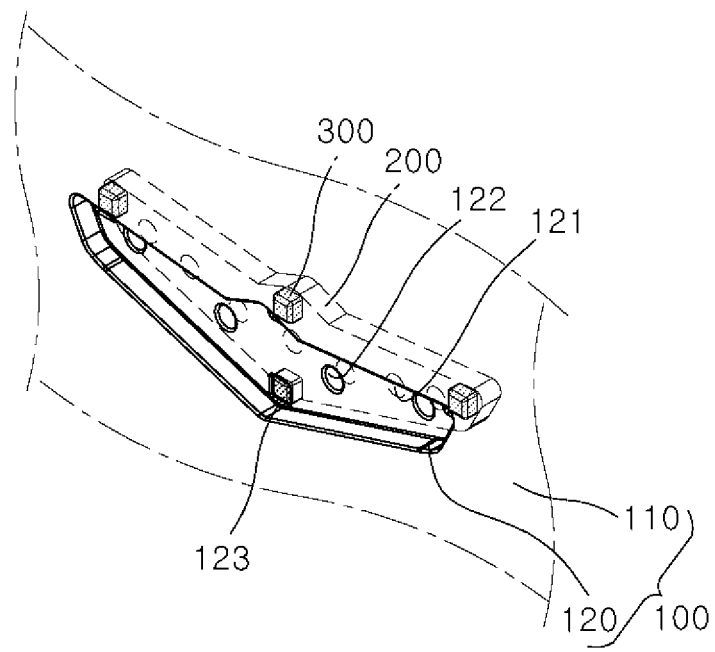
FIGS. 6A, 6B, and 6C are a perspective view of an assembly process of the emblem device in accordance with an exemplary embodiment.
Figure 6B:
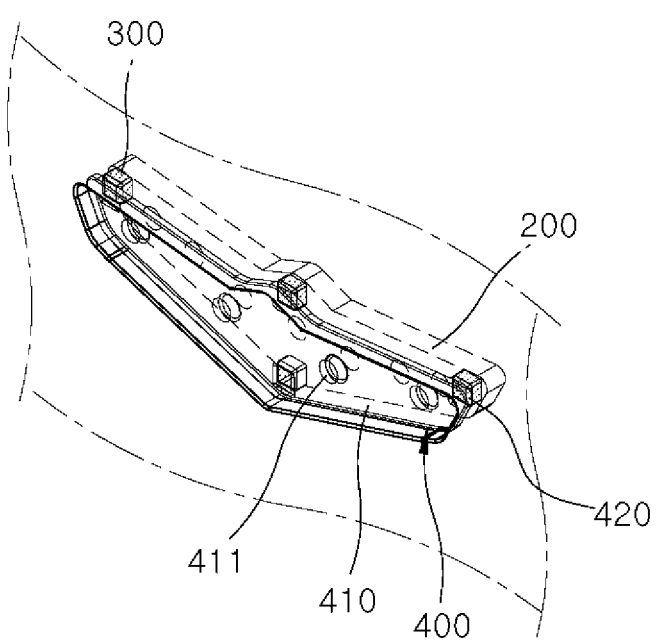
Figure 6C:
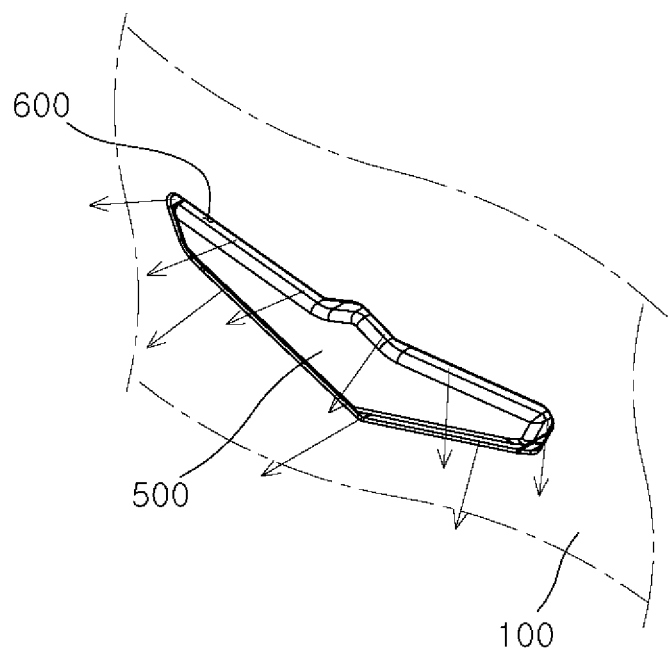

FIG. 1 is a perspective view of an emblem device constructed in accordance with an exemplary embodiment as viewed from one direction (e.g., a front direction). FIG. 2 is a sectional perspective view of the emblem device in accordance with an exemplary embodiment. FIG. 3 is a sectional perspective view when the emblem device in accordance with an exemplary embodiment as viewed from another direction (e.g. a rear direction). FIG. 4 is an exploded perspective view of the emblem device in accordance with an exemplary embodiment. FIG. 5 is an exploded perspective view when the emblem device in accordance with an exemplary embodiment as viewed from another direction (e.g., a rear direction). FIGS. 6A to 6C is a perspective view of an assembly process of the emblem device in accordance with an exemplary embodiment.

Referring to FIG. 1 to FIG. 6C, an emblem device 1 in accordance with an exemplary embodiment includes an air bag cover 100, a substrate 200, a light source 300, a light guide plate 400, and an emblem 500.

The air bag cover 100 covers an air bag housing having an air bag therein, and the emblem 500 to be described below may be mounted on an outer surface of the air bag cover 100. For example, the air bag cover 100 includes an air bag cover body 110 and a mounting portion 120.

The substrate 200 is mounted inside the air bag cover 100. Specifically, the substrate 200 is mounted in contact with an inner surface of the mounting portion 120 of the air bag cover 100 as illustrated in FIGS. 2 and 3.

The light source 300 is mounted on the substrate 200 and emits light. The light source 300 may be a light-emitting diode (LED) and the like.

The light guide plate 400 is mounted outside the air bag cover 100 and diffuses the light emitted from the light source 300. The light guide plate 400 is located in front of the light source 300 and the light emitted from the light source 300 is diffused by passing through the light guide plate 400.

The emblem 500 is located in front of the light guide plate 400 and covers a part of the light guide plate 400. The light emitted from the light guide plate 400 is emitted to the front of the emblem 500 through a space 600 that is formed between the air bag cover 100 and the emblem 500. Therefore, it is possible to indirectly illuminate the surroundings of the emblem 500.

The emblem 500 includes an emblem body 510 and emblem mounting protrusions 520. The emblem body 510 has an area smaller than that of the light guide plate 400. The emblem mounting protrusions 520 protrude from the emblem body 510 to one side and are coupled to the substrate 200 by passing through the light guide plate 400, the air bag cover 100, and the substrate 200. The emblem mounting protrusions 520 may be provided in a plural number while being spaced apart from each other at predetermined distances and may protrude toward the air bag cover 100 from the emblem body 510.

The air bag cover 100 includes the mounting portion 120 on which the substrate 200, the light source 300, the light guide plate 400, and the emblem 500 are mounted. The mounting portion 120 includes mounting holes 122 and an insertion hole 123. The emblem mounting protrusions 520 pass through the mounting holes 122, respectively. The light source 300 is inserted into the insertion hole 123 as illustrated in FIGS. 4 and 5.

The mounting portion 120 is mounted with the light guide plate 400 and the emblem 500 and includes a mounting groove 121 that communicates with the mounting holes 122 and the insertion hole 123. Therefore, the light guide plate 400 and the emblem 500 can be stably mounted in the mounting groove 121.

As illustrated in FIG. 6, the substrate 200 is located inside the air bag cover 100 (FIG. 6A) and the light guide plate 400, the light source 300, and the emblem 500 are sequentially disposed and mounted in the mounting groove 121 of the air bag cover 100 as illustrated in FIGS. 6B and 6C.

The air bag cover 100 further includes mounting protrusions 130 that protrude outward from the mounting portion 120 and are coupled to the substrate 200 by passing through the substrate 200. The substrate 200 includes first through holes 210 through which the emblem mounting protrusions 520 pass, respectively, and second through holes 220 through which the mounting protrusions 130 pass, respectively. The first through holes 210 are located at positions facing the mounting holes 122, respectively.

The emblem mounting protrusion 520 is provided with a first head 530 that is formed by melting and has a width greater than that of the first through hole 210, and the mounting protrusion 130 is provided with a second head 140 that is formed by melting and has a width greater than that of the second through hole 220. Therefore, the substrate 200, the light source 300, the light guide plate 400, and the emblem 500 can be firmly fixed to the air bag cover 100 as illustrated in FIGS. 2 and 3.

The light guide plate 400 includes a light guide plate body 410 and light guide plate blocks 420. The light guide plate body 410 comes into contact with the emblem body 510 and includes third through holes 411 through which the emblem mounting protrusions 520 pass, respectively. The third through holes 411 are located at positions facing the mounting holes 122 and the first through holes 210.

Specifically, the emblem mounting protrusions 520 of the emblem 500 sequentially pass through the third through holes 411 of the light guide plate body 410, the mounting holes 122 of the mounting portion 120, and the first through holes 210 of the substrate 200 and then are melted, respectively. Through this, the first heads 530 are formed on the emblem mounting protrusions 520, respectively. The first head 530 has a width greater than that of the first through hole 210. Accordingly, the substrate 200, the light source 300, the light guide plate 400, and the emblem 500 are fixed to the air bag cover 100. At this time, the first heads 530 may be fused or welded to the substrate 200.

The mounting protrusions 130 of the air bag cover 100 pass through the second through holes 220 of the substrate 200 and then are melted, respectively. Through this, the second heads 140 are formed on the mounting protrusions 130, respectively. The second head 140 has a width greater than that of the second through hole 220. Therefore, the substrate 200 is fixed to the air bag cover 100 once more. At this time, the second heads 140 may be fused or welded to the substrate 200.

Accordingly, the substrate 200, the light source 300, the light guide plate 400, and the emblem 500 can be firmly fixed to the air bag cover 100. Thus the substrate 200, the light source 300, the light guide plate 400, and the emblem 500 can be substantially prevented from being separated from the air bag cover 100.

The light guide plate blocks 420 protrude from the light guide plate body 410 to one side and come into contact with the light source 300. Therefore, the light emitted from the light source 300 may be transmitted to the light guide plate body 410 through the light guide plate blocks 420. A plurality of light sources 300 may be disposed spaced apart from each other along the edges of the substrate 200.

The plurality of light sources 300 may be disposed spaced apart from each other along the space 600, and the insertion hole 123 may be formed at positions corresponding to the light sources 300 and have the same number as the light sources 300. Thus, the light may be emitted from the light guide plate 400 through the space 600 formed between the air bag cover 100 and the emblem 500. Accordingly, indirect illumination for the emblem 500 can be implemented as illustrated in FIGS. 6A to 6C.

In an exemplary embodiment, the space 600 may be formed between the edge of the emblem 500 and the air bag cover 100, and the light source 300 may also be located between the edge of the emblem 500 and the air bag cover 100. The exemplary embodiment is not limited thereto, and the design of the space 600 may be changed according to the situation such as being located at the center. In another exemplary embodiment, the emblem 500 may include a transparent material and the entire emblem 500 may be illuminated.

Figure 7:
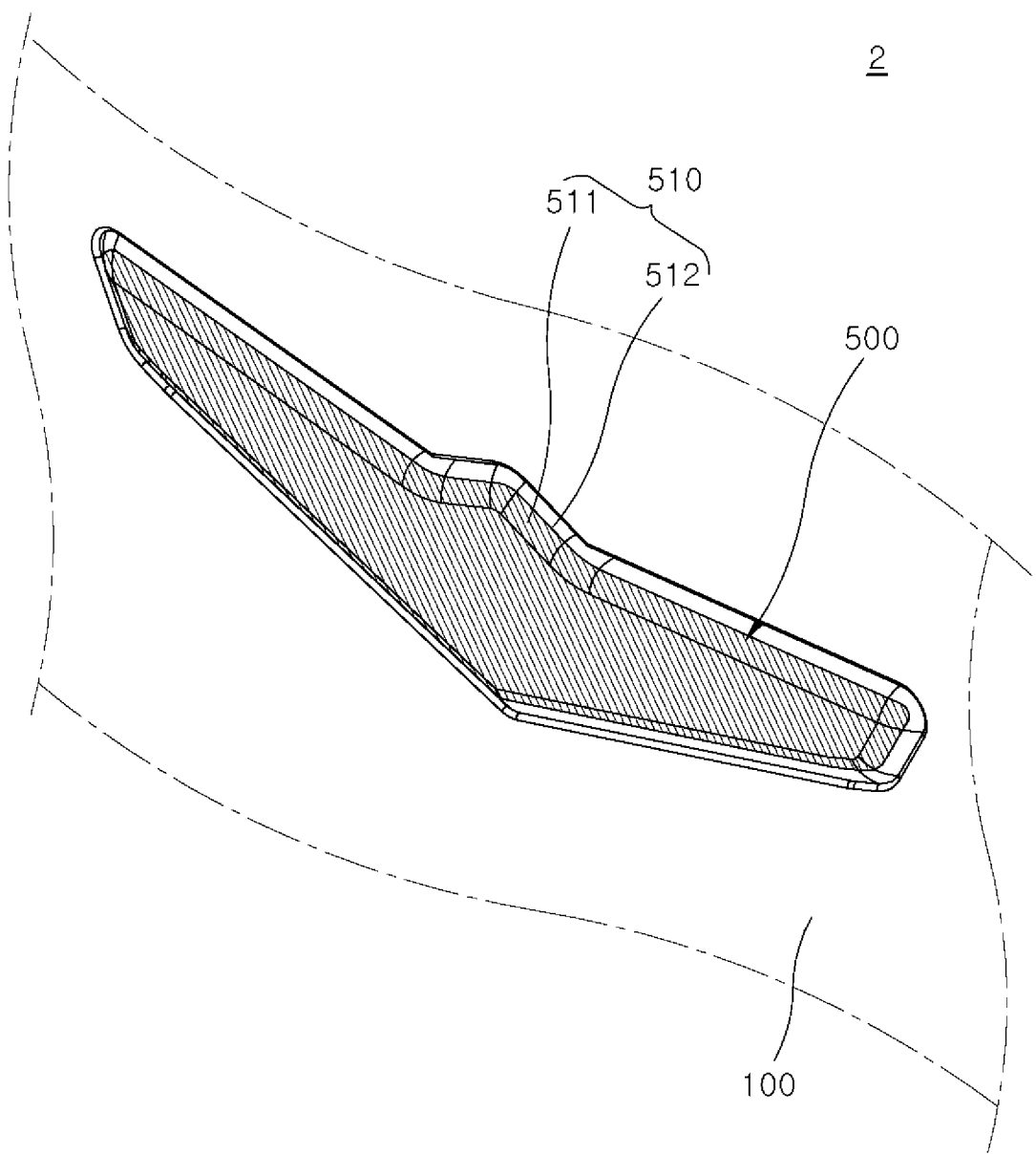
FIG. 7 is a perspective view of an emblem device constructed in accordance with another exemplary embodiment.
Figure 8:
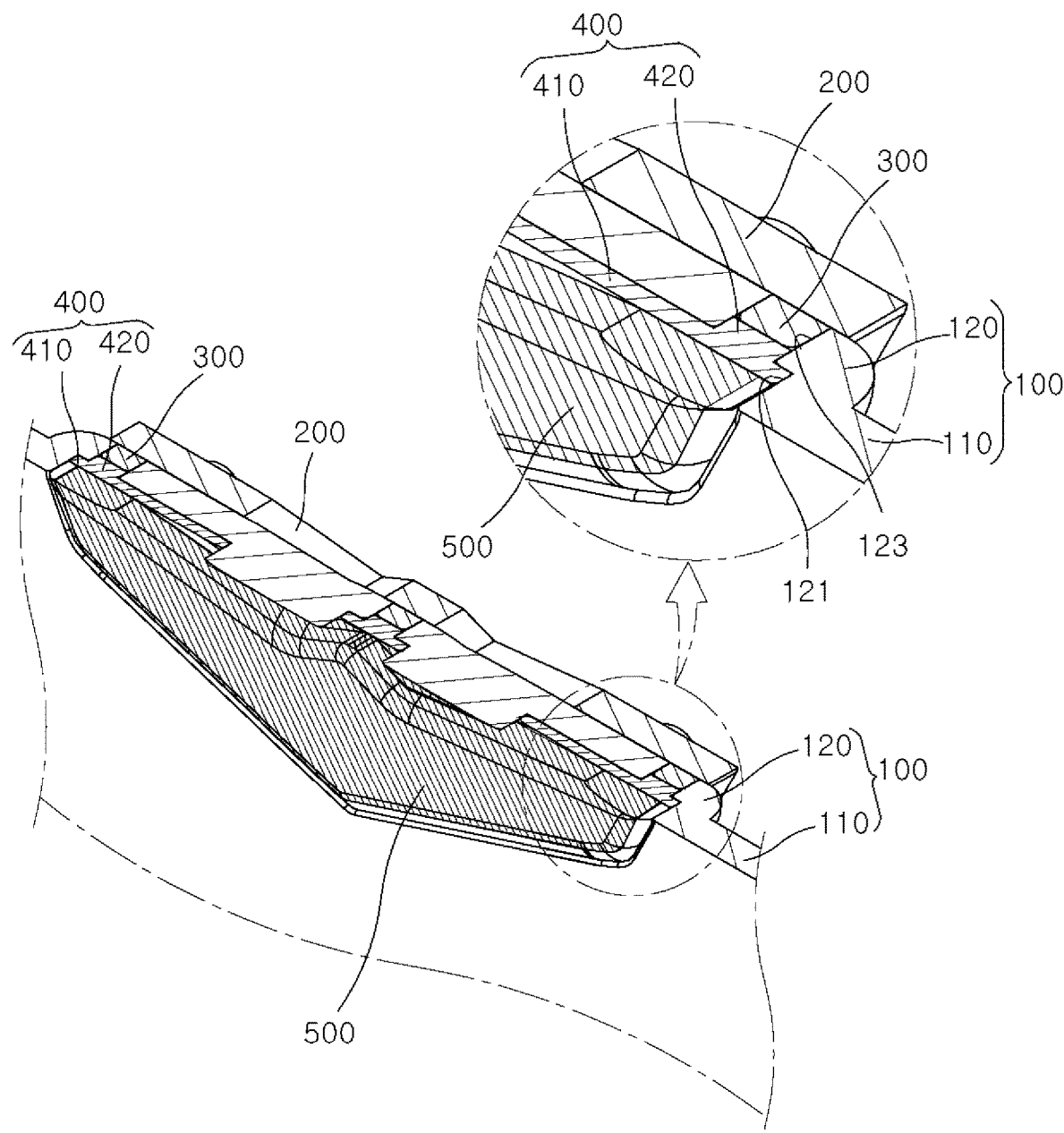
FIG. 8 is a sectional perspective view of the emblem device in accordance with another exemplary embodiment.

FIG. 7 is a perspective view of an emblem device constructed in accordance with another exemplary embodiment, and FIG. 8 is a sectional perspective view of the emblem device in accordance with another exemplary embodiment.

Hereinafter, the emblem device in accordance with another exemplary embodiment will be described. Detailed description of the same content of another exemplary embodiment as those of the exemplary embodiments above will be omitted.

Referring to FIG. 7 and FIG. 8, an emblem device 2 in accordance with another exemplary embodiment includes air bag cover 100, a substrate 200, a light source 300, a light guide plate 400, and an emblem 500. The emblem 500 includes a light blocking portion 511 that covers the light guide plate 400 and a light transmission portion 512 that is connected to the light blocking portion 511 and allows light emitted from the light guide plate 400 to pass therethrough. Referring to FIG. 7, the light transmission portion 512 is provided at an edge portion of the light blocking portion 511. However, the exemplary embodiment is not limited thereto, and the light transmission portion 512 may be provided at a central portion and the like according to the situation.

The light transmission portion 512 may include a transparent material. Thus, the light emitted from the light guide plate 400 can be easily emitted to the front of the emblem 500.

The emblem 500 includes an emblem body 510 and an emblem mounting protrusions 520. The emblem body 510 includes the light blocking portion 511 and the light transmission portion 512. The emblem mounting protrusions 520 protrude from the emblem body 510 to one side and are coupled to the substrate 200 by passing through the light guide plate 400, the air bag cover 100, and the substrate 200.

As described above, in the emblem device 2 in accordance with the exemplary embodiment, the emblem 500 for covering a part of the light guide plate 400 is disposed outside the air bag cover 100, and the light emitted from the light guide plate 400 is emitted to the front of the emblem 500 through a space 600 formed between the air bag cover 100 and the emblem 500, or the light transmission portion 512. Thus, it is possible to indirectly illuminate the surroundings of the emblem 500 and improve the strength of the air bag cover 100 with a simpler structure than typical emblems.

The safety alarm system and method for a vehicle according to the exemplary embodiments of the present invention senses the moving object located in the predetermined vehicle safety area of the vehicle using the image photographing module at the time of opening the vehicle door, thereby expanding the range in which the moving object may be sensed.

The safety alarm system and method for a vehicle according to the exemplary embodiments of the invention calculates the moving direction of the moving object at the time of sensing the moving objects to determine whether the moving object accesses the vehicle and generate the safety alarm based on the determination result, thereby reducing the false alarm.

Although the present disclosure have been described with reference to the embodiments illustrated in the drawings, the embodiments of the disclosure are for illustrative purposes only, and those skilled in the art will appreciate that various modifications and other equivalent embodiments are possible. Thus, the true technical scope of the disclosure should be defined by the following claims.

What is claimed is:

1. An emblem device for a vehicle, the emblem device comprising:
    an air bag cover;
    a substrate mounted inside the air bag cover;
    a light source mounted on the substrate and configured to emit light;
    a light guide plate mounted outside the air bag cover and configured to diffuse the light emitted from the light source; and
    an emblem located in front of the light guide plate and configured to cover a part of the light guide plate,
    wherein the light emitted from the light guide plate is emitted in front of the emblem through a space formed between the air bag cover and the emblem,
    wherein the emblem comprises:
    an emblem body; and
    one or more emblem mounting protrusions protruding from the emblem body to one side and coupled to the substrate by passing through the light guide plate, the air bag cover, and the substrate.

2. The emblem device of claim 1, wherein the emblem body has an area smaller than an area of the light guide plate.

3. The emblem device of claim 2, wherein:
    the air bag cover includes a mounting portion on which the substrate, the light source, the light guide plate, and the emblem are mounted, and
    the mounting portion comprises mounting holes through which the emblem mounting protrusions pass, respectively, and an insertion hole into which the light source is disposed.

4. The emblem device of claim 3, wherein:
    the mounting portion is mounted with the light guide plate and the emblem and comprises a mounting groove that communicates with the mounting holes and the insertion hole, and
    the air bag cover further comprises mounting protrusions protruding outward from the mounting portion and coupled to the substrate by passing through the substrate.

5. The emblem device of claim 4, wherein the substrate comprises first through holes through which the emblem mounting protrusions pass, respectively, and second through holes through which the mounting protrusions pass, respectively.

6. The emblem device of claim 5, wherein:
    each emblem mounting protrusion has a first head that is formed by melting and has a width greater than a width of each first through hole, and
    each mounting protrusion has a second head that is formed by melting and has a width greater than a width of each second through hole.

7. The emblem device of claim 3, wherein:
    a plurality of light sources are disposed spaced apart from each other along the space, and
    the insertion hole is formed in substantially the same number as the light sources at positions corresponding to the light sources.

8. The emblem device of claim 2, wherein the light guide plate comprises:
    a light guide plate body coming into contact with the emblem body and including third through holes through which the emblem mounting protrusions pass, respectively; and
    light guide plate blocks protruding from the light guide plate body to one side and coming into contact with the light source.

9. An emblem device for a vehicle, the emblem device comprising:
    an air bag cover;
    a substrate mounted inside the air bag cover;
    a light source mounted on the substrate and configured to emit light;
    a light guide plate mounted outside the air bag cover and configured to diffuse the light emitted from the light source; and
    an emblem located in front of the light source and including a light blocking portion configured to cover the light guide plate and a light transmission portion connected to the light blocking portion and configured to allow the light emitted from the light guide plate to pass therethrough,
    wherein the emblem comprises:
    an emblem body including the light blocking portion and the light transmission portion; and
    emblem mounting protrusions protruding from the emblem body to one side and coupled to the substrate by passing through the light guide plate, the air bag cover, and the substrate.

10. The emblem device of claim 9, wherein the light transmission portion comprises a transparent material.

* * * * *